(12) United States Patent
Henderson et al.

(10) Patent No.: US 12,510,880 B2
(45) Date of Patent: Dec. 30, 2025

(54) WATCHDOG CIRCUITRY OF A SURGICAL ROBOT ARM

(71) Applicant: CMR Surgical Limited, Cambridge (GB)

(72) Inventors: Hamish Henderson, Cambridge (GB); Andrew Scholan, Hertfordshire (GB); Gordon Thomas Deane, Cambridge (GB)

(73) Assignee: CMR Surgical Limited, Cambridge (GB)

( * ) Notice: Subject to any disclaimer, the term of this patent is extended or adjusted under 35 U.S.C. 154(b) by 520 days.

(21) Appl. No.: 17/905,087

(22) PCT Filed: Feb. 23, 2021

(86) PCT No.: PCT/GB2021/050441
§ 371 (c)(1),
(2) Date: Aug. 26, 2022

(87) PCT Pub. No.: WO2021/170986
PCT Pub. Date: Sep. 2, 2021

(65) Prior Publication Data
US 2023/0185278 A1 Jun. 15, 2023

(30) Foreign Application Priority Data
Feb. 27, 2020 (GB) .................. 2002760.3

(51) Int. Cl.
*A61B 34/37* (2016.01)
*G05B 19/4155* (2006.01)
*H04L 67/12* (2022.01)

(52) U.S. Cl.
CPC .......... *G05B 19/4155* (2013.01); *A61B 34/37* (2016.02); *G05B 2219/40269* (2013.01); *G05B 2219/40415* (2013.01); *H04L 67/12* (2013.01)

(58) Field of Classification Search
CPC ...... G05B 19/4155; G05B 2219/24125; G05B 2219/40269; G05B 2219/45117;
(Continued)

(56) References Cited

U.S. PATENT DOCUMENTS

2002/0087232 A1 7/2002 Lapham
2003/0050734 A1* 3/2003 Lapham .................. G06F 30/00
700/245
(Continued)

FOREIGN PATENT DOCUMENTS

CN 103810051 A 5/2014
CN 207983360 U 10/2018
(Continued)

OTHER PUBLICATIONS

Notification of Reason for Refusal for JP Application No. 2021-552230 mail date: Oct. 4, 2022 (7 pages).
(Continued)

*Primary Examiner* — Stephen Holwerda
(74) *Attorney, Agent, or Firm* — Finch & Maloney PLLC (57) ABSTRACT

A surgical robot with a surgical robot arm and a surgical robot arm controller. The surgical robot arm has a set of joints and a joint controller. The joint controller is configured to drive a joint of the set of joints. The surgical robot arm controller has a processor and watchdog circuitry. The processor is configured to send joint driving signals to the joint controller on a communication link. The watchdog circuitry is configured to: receive sequence values from the processor; determine whether each received sequence value matches a next expected value of a predetermined sequence; and if the received sequence value does not match the next expected value of the predetermined sequence, disable the communication link between the processor and the joint controller.

20 Claims, 6 Drawing Sheets

(58) Field of Classification Search
CPC .......... G05B 2219/40415; A61B 34/37; A61B 2034/2059; A61B 2090/066; B25J 9/1674; H04L 67/12
See application file for complete search history.

(56) References Cited

U.S. PATENT DOCUMENTS

| | | | | |
|---|---|---|---|---|
| 2012/0158012 | A1* | 6/2012 | Sandhu | H02H 7/0833 606/130 |
| 2015/0112481 | A1* | 4/2015 | Burns | B25J 9/1674 700/248 |
| 2017/0007336 | A1* | 1/2017 | Tsuboi | B25J 9/1674 |
| 2017/0128142 | A1* | 5/2017 | Still | G11C 29/1201 |
| 2017/0165837 | A1 | 6/2017 | Asano et al. | |
| 2018/0185099 | A1* | 7/2018 | Kottenstette | A61B 34/20 |

FOREIGN PATENT DOCUMENTS

| | | |
|---|---|---|
| EP | 3120979 A1 | 1/2017 |
| EP | 3242774 A1 | 11/2017 |
| GB | 2550577 A | 11/2017 |
| JP | 2007-136617 A2 | 6/2007 |
| JP | 2009165832 A | 7/2009 |
| JP | 2010114581 A | 5/2010 |
| JP | 2019518580 A | 7/2019 |
| JP | 2019-162717 A | 9/2019 |
| JP | 2019526406 A | 9/2019 |

OTHER PUBLICATIONS

Search Report for GB Application No. GB2002760.3 Mailing Date: Jul. 28, 2020 (3 pages).
International Search Report and Written Opinion for International Application No. PCT/GB2021/050441 Mailing Date: May 20, 2021 (13 pages).
Scheneker P S et al. "Development of a New High Dexterity Manipulator for Robot Assisted Microsurgery" vol. 2351 Oct. 31, 1994 (pp. 191-198).
Examination Report for IN Application No. 202247052895 mail date: Nov. 29, 2022 (6 pages).
Japanese Decision to Grant Corresponding to JP2021-552230 drafted Jul. 28, 2023.

* cited by examiner

WATCHDOG CIRCUITRY OF A SURGICAL ROBOT ARM

RELATED APPLICATIONS

This application claims priority under 35 U.S.C. § 371 as a national stage application of PCT Application No. PCT/GB2021/050441, filed Feb. 23, 2021, which claims priority to GB 2002760.3, filed Feb. 27, 2020, each of which is hereby incorporated herein by reference in its entirety.

BACKGROUND

Figure 1:
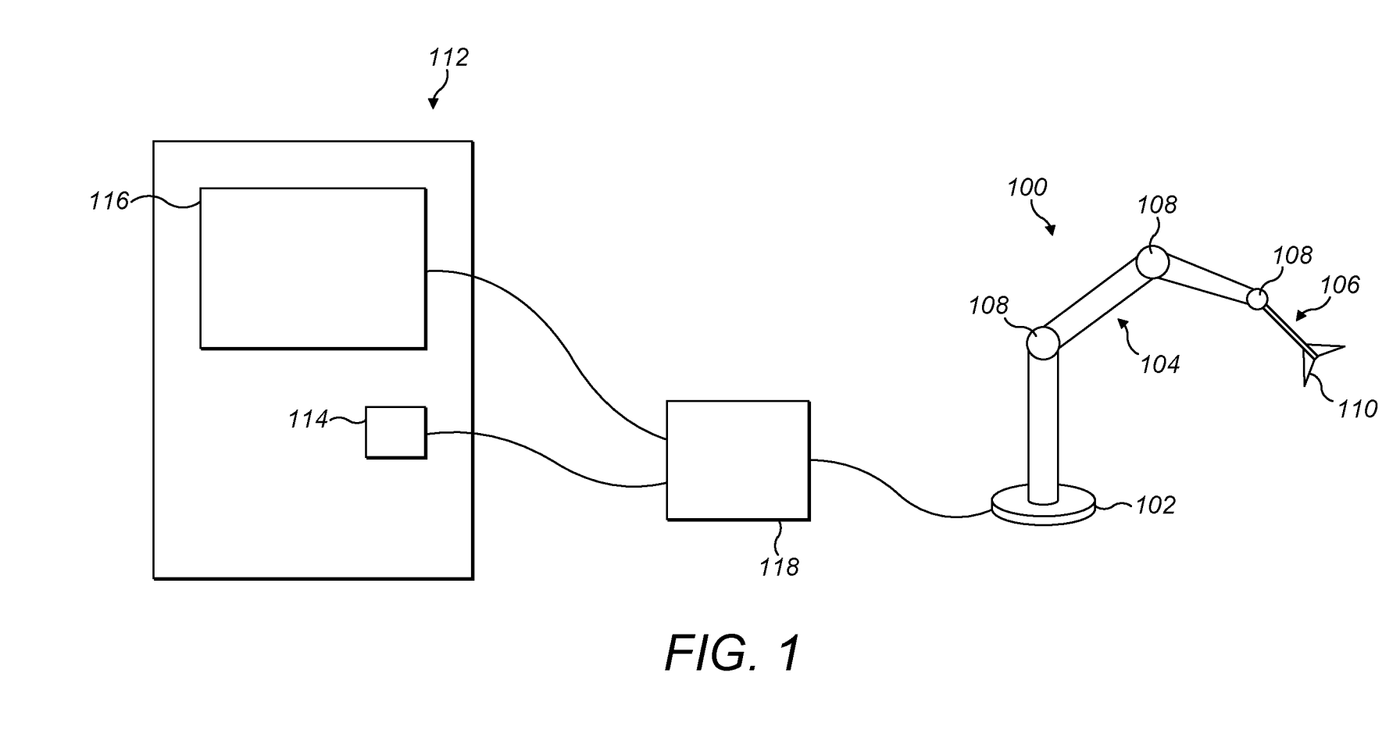
FIG. 1 illustrates a surgical robotic system for performing a surgical procedure.

It is known to use robots for assisting and performing surgery. FIG. 1 illustrates a typical surgical robotic system. A surgical robot 100 consists of a base 102, an arm 104 and an instrument 106. The base supports the robot, and may itself be attached rigidly to, for example, the operating theatre floor, the operating theatre ceiling or a cart. The arm extends between the base and the instrument. The arm is articulated by means of multiple flexible joints 108 along its length, which are used to locate the surgical instrument in a desired location relative to the patient. The surgical instrument is attached to the distal end of the robot arm. The surgical instrument penetrates the body of the patient at a port so as to access the surgical site. The surgical instrument comprises a shaft connected to a distal end effector 110 by a jointed articulation. The end effector engages in a surgical procedure. In FIG. 1, the illustrated end effector is a pair of jaws. A surgeon controls the surgical robot 100 via a remote surgeon console 112. The surgeon console comprises one or more surgeon input devices 114. These may take the form of a hand controller or foot pedal. The surgeon console also comprises a display 116.

A control system 118 connects the surgeon console 112 to the surgical robot 100. The control system receives inputs from the surgeon input device(s) and converts these to control signals to move the joints of the robot arm 104 and end effector 110. The control system sends these control signals to the robot. Joint controllers on the robot arm 104 drive the joints 108 to move accordingly.

The robot arm 104 may comprise a robot arm controller which detects faults in the arm. A fault communication network in the arm signals a detected fault to the joint controllers on the robot arm 104.

SUMMARY OF THE INVENTION

According to an aspect of the invention, there is provided a surgical robot comprising: a surgical robot arm comprising a set of joints and a joint controller, the joint controller configured to drive a joint of the set of joints; and a surgical robot arm controller comprising a processor and watchdog circuitry, the processor configured to send joint driving signals to the joint controller on a communication link, the watchdog circuitry configured to: receive sequence values from the processor; determine whether each received sequence value matches a next expected value of a predetermined sequence; and if the received sequence value does not match the next expected value of the predetermined sequence, disable the communication link between the processor and the joint controller.

The watchdog circuitry may be configured to: count the time elapsed from the receipt of a sequence value; compare the elapsed time to a timeout value; and if the elapsed time exceeds the timeout value before receipt of another sequence value, disable the communication link between the processor and the joint controller.

The surgical robot may comprise a switch on the communication link between the processor and the joint controller, the state of the switch being controllable by the watchdog circuitry, wherein the watchdog circuitry may be configured to open the switch to disable the communication link between the processor and the joint controller.

The communication link may be an ethernet link, and the switch may be an ethernet switch.

The joint controller may be configured to: count the time elapsed from the receipt of a communication from the processor; compare the elapsed time to a further timeout value; and if the elapsed time exceeds the further timeout value before receipt of another communication from the processor, enter a fault state.

If the joint that the joint controller is configured to drive is stationary at the time the joint controller enters the fault state, the joint controller may hold the joint in position.

If the joint that the joint controller is configured to drive is moving at the time the joint controller enters the fault state, the joint controller may decelerate the joint to a stop and then hold the joint in position.

On disabling the communication link between the processor and the joint controller, the watchdog circuitry may be configured to send preset joint driving signals to the joint controller, those present joint driving signals being so as to cause the joint controller to hold the joint in position.

On disabling the communication link between the processor and the joint controller, the watchdog circuitry may be configured to reset the processor.

On being reset, the processor may be configured to send a predetermined starting sequence value to the watchdog circuitry at a predetermined time after the reset.

On disabling the communication link between the processor and the joint controller, the watchdog circuitry may be configured to raise an alarm.

The predetermined sequence may be a Gray code.

The watchdog circuitry may be configured to generate the predetermined sequence on the fly.

The processor may be configured to generate the sequence values on the fly, and send the sequence values to the watchdog circuitry.

The surgical robot arm controller may be either (i) integrated in the surgical robot arm, or (ii) integrated into a support for supporting the surgical robot arm.

The surgical robot arm may comprise a set of joint controllers, each joint controller configured to drive a respective joint of the set of joints, and the processor may be configured to send joint driving signals to each joint controller on the communication link.

The joint controllers may be connected together in a linear chain such that disabling the communication link prevents joint driving signals being sent from the processor to each joint controller.

The surgical robot arm may comprise a set of joint controllers, each joint controller configured to drive a respective joint of the set of joints, and the processor may be configured to send joint driving signals to each joint controller on a respective communication link between the processor and that joint controller.

If the received sequence value does not match the corresponding value of the predetermined sequence, the watchdog circuitry may be configured to disable each communication link between the processor and the set of joint controllers.

Each joint controller may be configured to: count the time elapsed from the receipt of a communication from the processor; compare the elapsed time to a further timeout value; and if the elapsed time exceeds the further timeout value before receipt of another communication from the processor, enter a fault state.

BRIEF DESCRIPTION OF THE FIGURES

The present invention will now be described by way of example with reference to the accompanying drawings. In the drawings.

DETAILED DESCRIPTION

The following describes a surgical robotic system of the type illustrated in FIG. 1. The surgical robotic system comprises one or more surgical robot arm and surgical instrument, along with a remote surgeon console. The remote surgeon console is connected to the surgical robot arm(s) via a control system which includes a central controller located remotely from the surgical robot arm.

Figure 2:
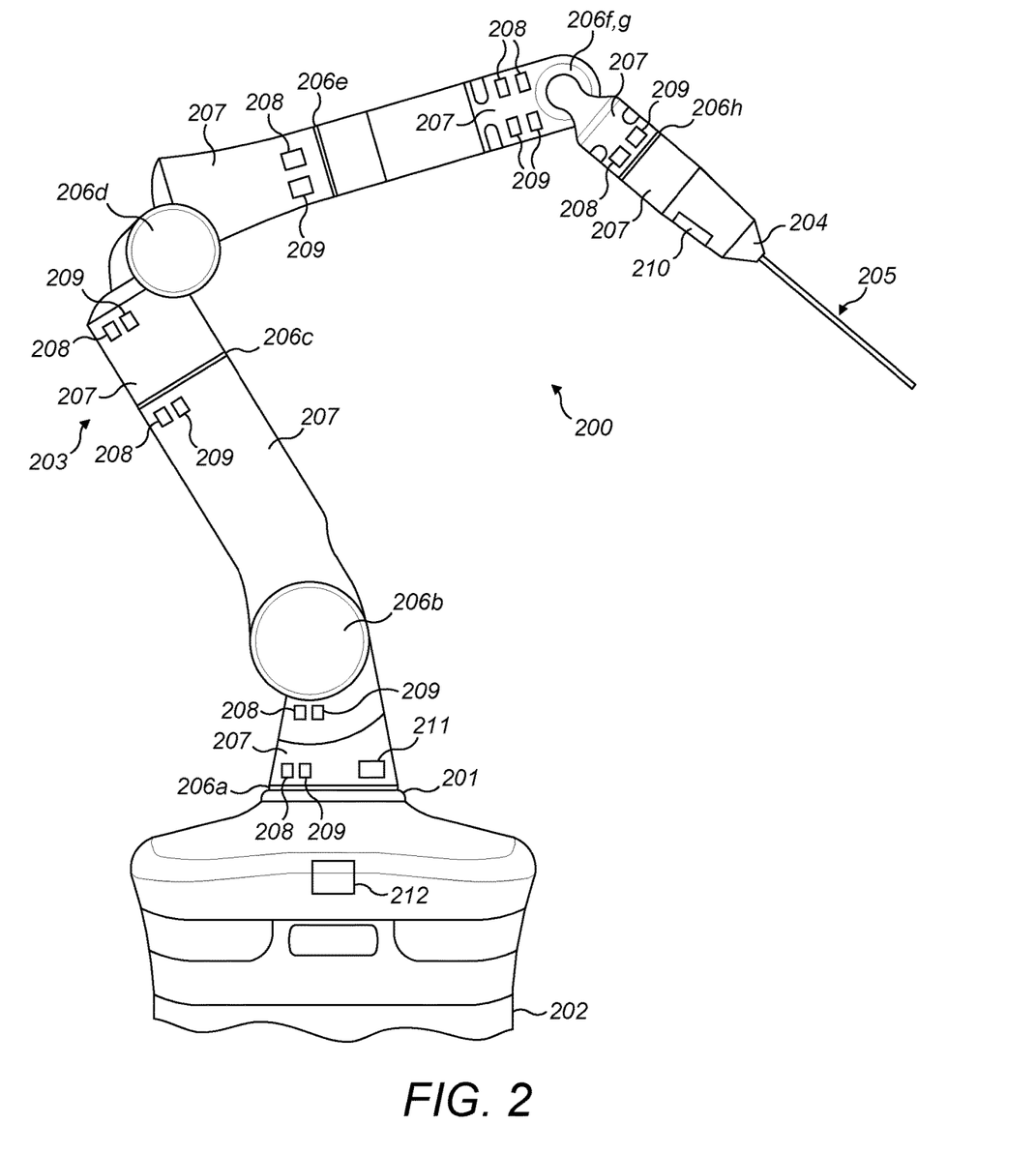
FIG. 2 illustrates a surgical robot.

FIG. 2 illustrates an exemplary surgical robot 200. The robot comprises a base 201 which is fixed in place when a surgical procedure is being performed. Suitably, the base 201 is mounted to a chassis. In FIG. 2, the chassis is a cart 202. This cart may be a bedside cart for mounting the robot at bed height. Alternatively, the chassis may be a ceiling mounted device, or a bed mounted device.

A robot arm 203 extends from the base 201 of the robot to a terminal end 204 for attaching to a surgical instrument 205. The arm is flexible. It is articulated by means of multiple flexible joints 206 along its length. In between the joints are rigid arm links 207. Suitably, the joints are revolute joints. The robot arm has at least seven joints between the base and the terminal end. The robot arm 200 illustrated in FIG. 2 has eight joints in total between the base 201 and the terminal end 204. The joints include one or more roll joints (which have an axis of rotation along the longitudinal direction of the arm links on either side of the joint), one or more pitch joints (which have an axis of rotation transverse to the longitudinal direction of the preceding arm link), and one or more yaw joints (which have an axis of rotation transverse to the longitudinal direction of the preceding arm link and also transverse to the rotation axis of a co-located pitch joint). In the example of FIG. 2: joints 206a, 206c, 206e and 206h are roll joints; joints 206b, 206d and 206f are pitch joints; and joint 206g is a yaw joint. The order of the joints sequentially from the base 201 of the robot arm to the terminal end 204 of the robot arm is: roll, pitch, roll, pitch, roll, pitch, yaw, roll. There are no intervening joints in FIG. 2. The end of the robot arm distal to the base can be articulated relative to the base by movement of one or more of the joints of the arm.

The surgical robot arm could be jointed differently to that illustrated in FIG. 2. For example, the arm may have fewer than eight or more than eight joints. The arm may include joints that permit motion other than rotation between respective sides of the joint, for example one or more telescopic joints.

The surgical robot arm comprises a set of motors 208. Each motor 208 drives one or more of the joints 206. In the example of FIG. 2, a separate motor 208 drives each joint 206. Alternatively, the surgical robot arm may comprise any combination of: motors, each of which drives a single joint; and motors, each of which drives two or more joints. The motors 208 are controlled by joint controllers 209. In the example of FIG. 2, a separate joint controller 209 drives each motor 208. Alternatively, the surgical robot arm may comprise any combination of: joint controllers, each of which drives a single joint; and joint controllers, each of which drives two or more joints.

The robot arm may also comprise a series of sensors. These sensors may comprise, for each joint: a position sensor for sensing the position of the joint; and/or a further position sensor for sensing the position of the motor driving the joint; and/or a torque sensor for sensing the applied torque about the joint's rotation axis. One or any combination of these sensors for a joint may be integrated with the motor for that joint. The robot arm may also comprise current sensors. The outputs of the sensors are passed to the control system.

The surgical instrument 205 attaches to a drive assembly at the terminal end of the robot arm 203. This attachment point is at all times external to the patient. The surgical instrument 205 has an elongate profile, with a shaft spanning between its proximal end which attaches to the robot arm and its distal end which accesses the surgical site within the patient body. The surgical instrument may be configured to extend linearly parallel with the rotation axis of the joint 206h of the arm. For example, the surgical instrument may extend along an axis coincident with the rotation axis of the joint 206h of the arm.

The proximal end of the surgical instrument and the instrument shaft may be rigid with respect to each other and rigid with respect to the distal end of the robot arm when attached to it. An incision is made into the patient body, through which a port is inserted. The surgical instrument may penetrate the patient body through the port to access the surgical site. Alternatively, the surgical instrument may penetrate the body through a natural orifice of the body to access the surgical site. At the proximal end of the instrument, the shaft is connected to an instrument interface. The instrument interface engages with the drive assembly at the distal end of the robot arm. Specifically, individual instrument interface elements of the instrument interface each engage a respective individual drive assembly interface element of the drive assembly. The instrument interface is releasably engageable with the drive assembly. The instrument can be detached from the robot arm manually without requiring any tools. This enables the instrument to be detached from the drive assembly quickly and another instrument attached during an operation.

At the distal end of the surgical instrument, the distal end of the instrument shaft is connected to an end effector by an articulated coupling. The end effector engages in a surgical procedure at the surgical site. The end effector may be, for example, a pair of jaws, a pair of monopolar scissors, a needle holder, a fenestrated grasper, or a scalpel. The articulated coupling comprises several joints. These joints enable the pose of the end effector to be altered relative to the direction of the instrument shaft.

Drive is transmitted from the robot arm to the end effector in any suitable manner. For example, the drive assembly at the terminal end of the robot arm may comprise instrument drive joints 210 which transfer drive from the surgical robot arm to the instrument interface via the respective interface elements described above, and thereby to the instrument joints.

A control system connects the surgeon console to the one or more surgical robots. This control system comprises a central controller, of the type shown as 118 in FIG. 1. The central controller comprises a processor and a memory. The memory stores, in a non-transient way, software code that can be executed by the processor to cause the processor to control the surgeon console and the one or more surgical robot arms and instruments in the manner described herein.

The control system also comprises a surgical robot arm controller for each surgical robot. The surgical robot arm controller is co-located with the surgical robot. The surgical robot arm controller 211 may be located in the surgical robot arm 203. The surgical robot arm controller may be integrated inside the casing of the surgical robot arm 203. Alternatively, the surgical robot arm controller 212 may be located in the support or chassis of the surgical robot arm. For example, the surgical robot arm controller 212 may be located in the cart to which the surgical robot arm is mounted. Alternatively, the surgical robot arm controller may be distributed across both the surgical robot arm 203 and the chassis.

The surgical robot arm controller comprises a processor and a memory. The memory stores, in a non-transient way, software code that can be executed by the processor to cause the processor to control the surgeon console and the one or more surgical robot arms and instruments in the manner described herein.

The control system converts commands received from a surgeon input device of the surgeon console to drive signals. This conversion is carried out by one or a combination of the central controller and the surgical robot arm controller of the surgical robot arm associated with the surgeon input device. The drive signals are sent to joint controllers of the surgical robot arm and/or surgical instrument associated with the surgeon input device. Those joint controllers drive the joint motors accordingly. The joints are thereby driven to cause the end effector to adopt the desired position commanded by the surgeon input device. Manipulation of the surgical instrument is thereby controlled by the control system in response to manipulation of the surgeon input device.

Figure 3:
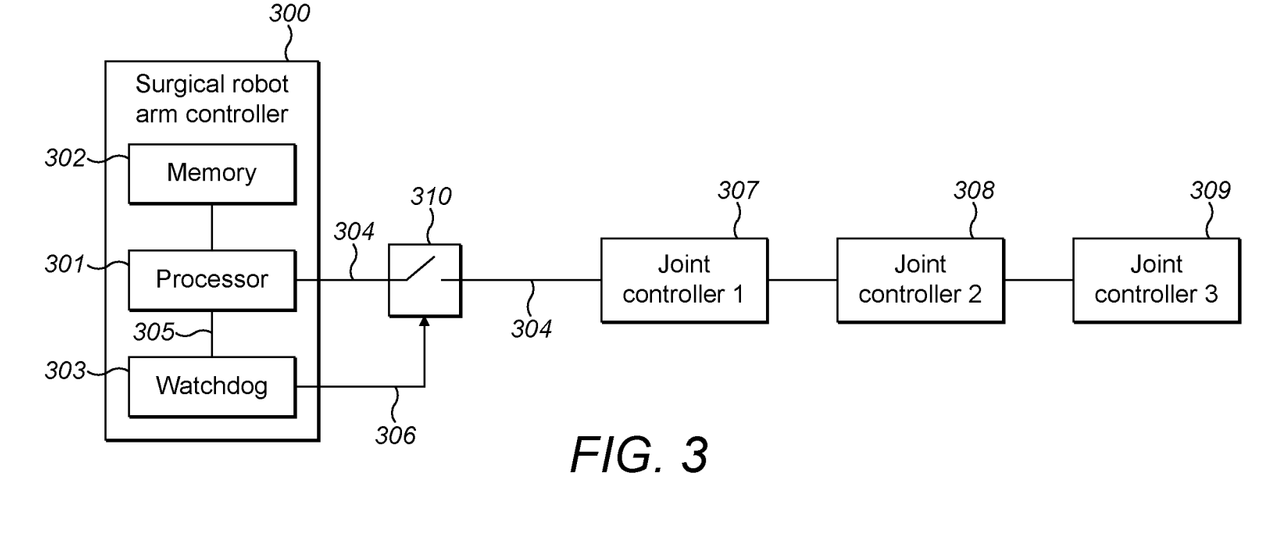
FIG. 3 illustrates an exemplary surgical robot arm controller.

In addition to sending drive signals to the joint controllers of its associated surgical robot arm, the surgical robot arm controller also performs fault detection. FIG. 3 illustrates an exemplary surgical robot arm controller for detecting a fault in the processor which generates the drive signals which are sent to the joint controllers.

The surgical robot arm controller 300 of FIG. 3 comprises a processor 301, memory 302 and watchdog circuitry 303. The processor 301 is connected to the memory 302. The processor 301 has an output 305 connected to an input of the watchdog circuitry 305. The processor has a communication link 304 with one or more joint controllers 307, 308, 309 of the surgical robot arm. This communication link 304 may be a physical medium. For example, the communication link 304 may be a cable. The communication link 304 may be an ethernet link. For example, the communication link 304 may be an EtherCAT link. The processor 301 sends drive signals to the joint controllers 307, 308, 309 on the communication link 304.

In the example depicted in FIG. 3, the joint controllers 307, 308 and 309 are daisy-chained together. In other words, they are connected together in a linear chain. The first joint controller in the chain is joint controller 307. Joint controller 307 receives communications on communication link 304 for each of joint controllers 307, 308 and 309. Joint controller 307 reads the communications intended for it, and routes the communications on to joint controllers 308 and 309. Each joint controller in turn performs the same operation.

In an alternative configuration, the joint controllers 307, 308 and 309 are independently connected to the processor 301 via individual communication links. In this alternative configuration, the processor 301 sends joint driving signals to each joint controller on the individual communication link between the processor and that joint controller.

A switch 310 lies in the line of the communication link 304. For the case that the communication link is an ethernet link, the switch is an ethernet switch. The watchdog circuitry 303 outputs a control signal 306 to the switch 310.

The watchdog circuitry 303 monitors the output 305 of the processor 301 for the purpose of fault detection. Upon detecting a fault, the watchdog circuitry 303 disables the communication link(s) 304 between the processor 301 and the joint controller(s). With the circuitry of FIG. 3, this is achieved by the watchdog circuitry 303 controlling the switch 310 to open.

The operation of the watchdog circuitry 303 will now be described in more detail with reference to the exemplary detailed structure of the surgical robot arm controller shown in FIG. 4 and the flowchart of FIG. 5.

The processor 301 generates a sequence of values which it transmits to the watchdog circuitry 303 on signal line 305. That sequence of values is a predetermined sequence. That predetermined sequence may be a Gray code sequence. A Gray code is a sequence in which two successive values differ by only one bit. The following table illustrates successive values of a Gray code sequence. This Gray code sequence is a 2-bit indicator. Each value in the sequence is two bits, having the bit values shown in the table.

| First bit | Second bit |
| --- | --- |
| 1 | 1 |
| 1 | 0 |
| 0 | 0 |
| 0 | 1 |

The Gray code sequence comprises repetitive cycles of these four values, i.e. 11, 10, 00, 01, 11, 10, 00, 01, 11 etc. The processor transitions from one value to the next value in the sequence at a set time. For example, the time t between transitions may be $0.5\ \mu s < t < 2\ \mu s$. The time between transitions may be 1 $\mu s$.

The processor may generate the sequence of values on the fly. In other words, after the processor has transmitted a value to the watchdog circuitry, it then goes on to generate the next value in the sequence. It then transmits this next value to the watchdog circuitry, following which it generates the next value in the sequence. Alternatively, the processor 301 may store a predetermined sequence of values in memory 302. In this case, the processor reads each value in turn from the memory 302 and transmits that value to the watchdog circuitry 303.

Figure 4:
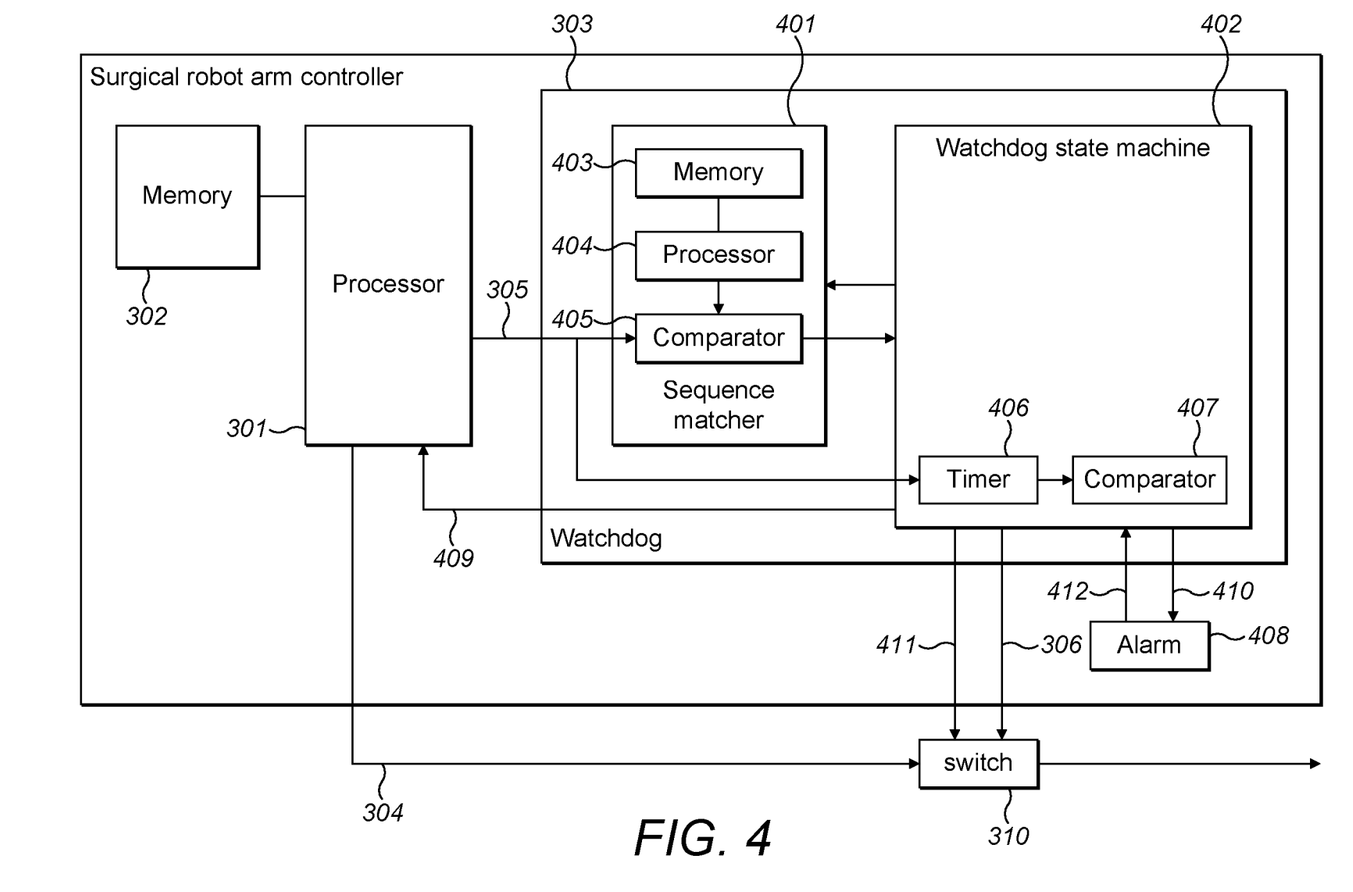
FIG. 4 illustrates the exemplary internal components of the watchdog circuitry of a surgical robot arm controller.

The watchdog circuitry 303 of FIG. 4 comprises a sequence matcher 401 and a watchdog state machine 402. The sequence matcher 401 may comprise a memory 403, processor 404 and comparator logic 405. Although shown inside the sequence matcher 401, the memory 403 may alternatively be located within the watchdog circuitry 303 but outside the sequence matcher 401. For example, the memory 403 may be RAM memory. The memory 403 may store each sequence value received from the processor 301. Suitably, the memory 403 maintains stored at least the two sequence values most recently received from the processor 301. The memory 403 may only store the two sequence values most recently received from the processor 301. In this case, upon receiving a further sequence value, the oldest of the two currently stored sequence values is no longer stored and the further sequence value stored. This may be implemented, for example, in a circular buffer where the oldest stored value is overwritten upon a newly received value being written to the buffer.

The following describes two exemplary ways in which the sequence matcher 401 may determine whether the sequence value received from the processor 301 matches the next expected value of the predetermined sequence.

In the first example, the sequence matcher 401 receives a sequence value (n) from the processor 301. The sequence matcher 401 retrieves the two received sequence values (n−1, n−2) prior to the current received sequence value (n) from memory 403. Thus, the sequence matcher 401 has three successive received sequence values: n−2, n−1 and n. The comparator 405 of the sequence matcher 401 compares the three received sequence values to determine whether: (i) the sequence value n differs from the sequence value n−1 by exactly one bit; and (ii) both bits of the sequence value n are different to the bits of the sequence value n−2. If both these conditions are true, then the comparator 405 determines that the sequence value n matches the next expected value of the predetermined sequence. If one or both of these conditions are not true, then the comparator 405 determines that the sequence value n does not match the next expected value of the predetermined sequence. The output of the comparator is one of two values: the first value indicates that the received sequence value n matches the next expected value of the predetermined sequence; and the second value indicates that the received sequence value n does not match the next expected value of the predetermined sequence. The sequence matcher outputs the comparator output to the watchdog state machine 402.

In this first example, the comparator may be implemented by analogue logic. For example, the comparator may be implemented by one or a set of high-gain differential amplifiers. In this case, processor 404 may be omitted from the sequence matcher.

In the second example, the processor 404 generates the predetermined sequence. The processor 404 may generate each value of the predetermined sequence on the fly as described above with respect to the processor 301. Alternatively, the predetermined sequence values may be stored in memory 403. The processor then reads each value in turn from memory 302. The sequence matcher generates the predetermined sequence values at the same rate as the processor 301 transitions from one value to the next value in the sequence. Thus, the processor 301 and sequence matcher 401 both operate according to the same protocol in which the same sequence values are generated at the same rate. The processor 301 and sequence matcher 401 are initially synchronised in their generation of the predetermined sequence. The sequence matcher 401 receives a sequence value from the processor 301. At comparator 405, the sequence matcher compares the sequence value received from the processor 301 to the current value of the predetermined sequence held by the sequence matcher. The output of the comparator is one of two values: the first value indicates that the sequences values are matched; and the second value indicates that the sequence values are not matched. The sequence matcher outputs the comparator output to the watchdog state machine 402.

The watchdog circuitry may reset the processor 301 and sequence matcher 401. In this case, the protocol implemented by the processor 301 and sequence matcher 401 may mandate that a specific sequence value of the predetermined sequence is the first to follow a reset. Thus, following the reset, the processor 301 generates the same sequence value that the sequence matcher 401 is expecting to receive as the next sequence value. Additionally, the protocol may mandate that that sequence value is generated at a set time after the reset. Thus, following the reset, the processor 301 and sequence matcher 401 are synchronised.

The watchdog state machine may comprise a timer 406 and comparator logic 407. The sequence value from the processor 301 is input as a control signal to the timer 406. On receiving the sequence value from the processor 301, the timer restarts 406. The comparator 407 compares the time signal output from the timer to a timeout value t'. The time out value t' may lie in the range 50 μs<t'<100 μs. The time out value t' may lie in the range 1500 μs<t'<2000 μs. The output of the comparator 407 is one of two values: the first value indicates that the time signal output from the timer is less than the timeout value t'; and the second value indicates that the time signal output from the timer is greater than the timeout value t'.

The timer 406 may be implemented as circuitry which receives a clock signal from an oscillator external to the watchdog state machine 402. The oscillator may be external to the watchdog circuitry 303 but internal to the surgical robot arm controller. The timer determines the time elapsed, according to the received clock signal, following receipt of the sequence value from the processor 301.

The watchdog state machine 402 has control outputs to the switch 310, an alarm 408 and the processor 301. The watchdog state machine is able to change the state of the switch 310 via the control signal 306 so as to enable or disable the communication link 304 from the processor 301 to the joint controller(s).

The watchdog state machine is able to output a control signal to the alarm 408 to cause the alarm to generate an alarm signal. This alarm signal may be any one or combination of the following: a visible alarm on the surgical robot arm, such as a light; an audible alarm projected from the surgical robot arm, such as a siren; an alarm signal which is communicated to the central controller for output to the surgeon console. The alarm 408 sends a signal 412 identifying the alarm's state to the watchdog state machine 402. The watchdog state machine may send a signal on control output 409 to the processor 301 identifying the alarm state.

The watchdog state machine 402 is able to send a reset signal on the control output to the processor 301. This reset signal, or a subsequent signal sent from the watchdog state machine 402 to the processor 301 may identify the reason for the reset. For example, the reason may be identified as an error in the predetermined sequence received from the processor 301. The reason may be identified as a reason unrelated to the predetermined sequence received from the processor 301. The watchdog state machine 402 is also able to send a signal to the switch 310 for being output on the communication link 304 to the joint controller(s).

Typically, the watchdog circuitry 303 is implemented by a field programmable gate array (FPGA).

Figure 5:
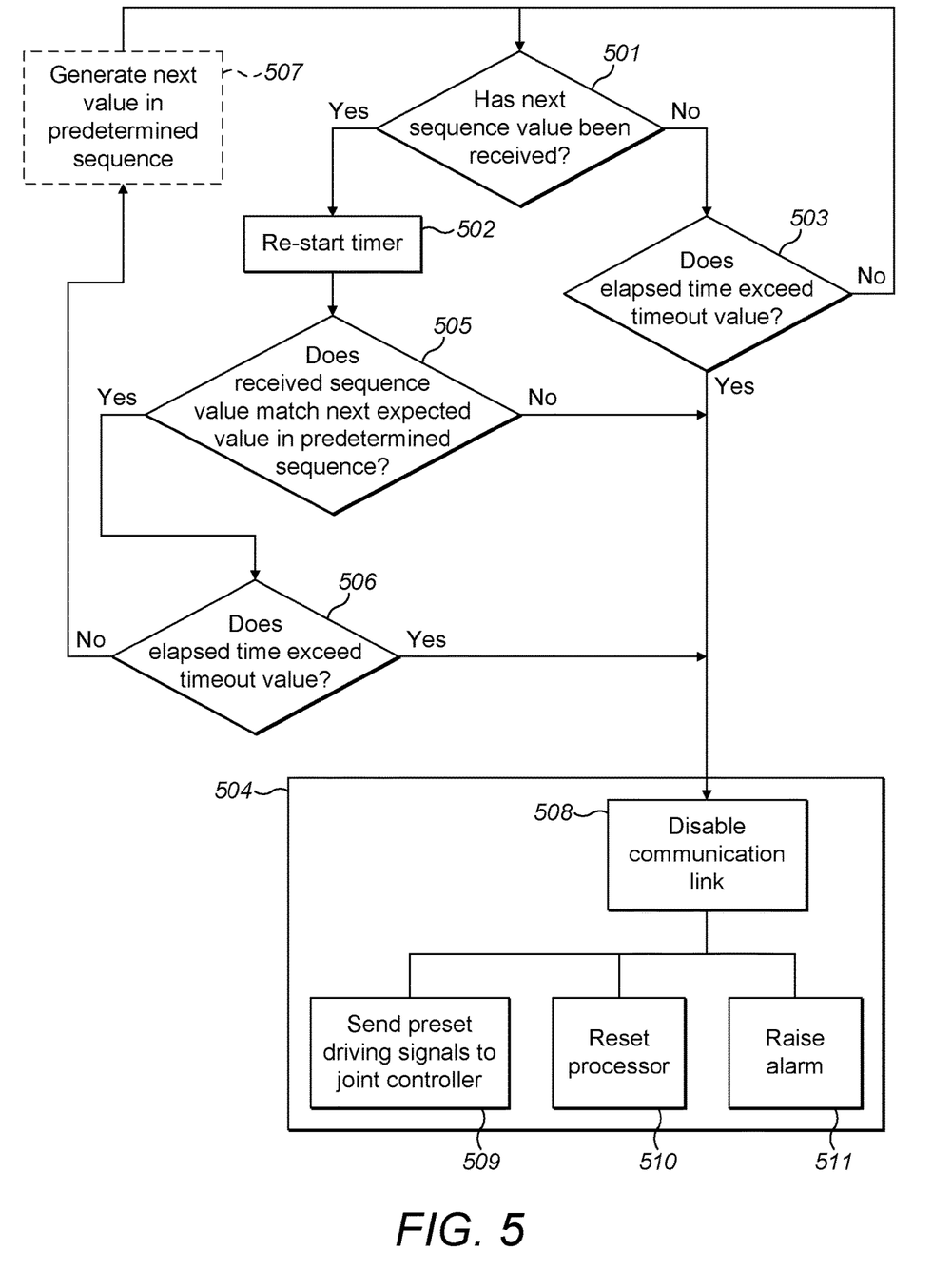
FIG. 5 is a flowchart depicting a method carried out by the watchdog circuitry of a surgical robot arm controller.

The flowchart of FIG. 5 illustrates a method by which the watchdog circuitry 303 may operate.

At step 501, the watchdog circuitry determines whether the next sequence value has been received from the processor 301. If the answer is YES, then the watchdog state machine 402 restarts the timer 406 at step 502. If the answer is NO, then the method continues to step 503. At step 503, the comparator 407 of the watchdog circuitry determines whether the elapsed time since the last sequence value was received from the processor 301 exceeds the timeout value t'. If the answer is NO, then the method returns to step 501. If the answer is YES, then the method moves on to step 504, which will be described in more detail later.

Following receipt of the next sequence value and restarting of the timer at step 502, the method moves on to step 505. At step 505, the sequence matcher determines whether the received sequence value matches the next expected value in the predetermined sequence. If the answer is NO, then the method continues to step 504, which will be described in more detail later. If the answer is YES, then the method continues to step 506. At step 506, the watchdog state machine 403 determines whether the elapsed time since the last sequence value was received from the processor 301 exceeds the timeout value t'. If the answer is YES, then the method moves on to step 504, which will be described in more detail later. If the answer is NO, then the method moves on to optional step 507. At step 507, the sequence matcher generates the next value in the predetermined sequence. This generation may be an on the fly calculation as described above. Alternatively, the generation may be reading the next value from memory. Alternatively, step 507 may be omitted if the sequence matcher determines whether the sequence value received from the processor 301 matches the next expected value of the predetermined sequence using the method of the first example described above. Following step 507, the method returns to step 501.

If either: (i) the elapsed time since the last sequence value was received from the processor 301 exceeds the timeout value t' before receipt of the next sequence value from the processor 301, or (ii) the received sequence value does not match the next expected value in the predetermined sequence, then the watchdog state machine responds by implementing action 508 and one or a combination of actions 509, 510 and 511 laid out in step 504. The first action at step 508 is to disable the communication link 304 between the processor 301 and the joint controller(s). This may be implemented, as described above, by sending a control signal to the switch 310 which changes the state of the switch 310 to "OPEN" thereby breaking the communication path 304 from the processor 301 to the joint controller(s). Communication signals output from the processor 301 do not pass through the open switch. In the case that multiple joint controllers are connected in a linear manner as shown in FIG. 3, opening the switch 310 prevents the processor 301 from sending driving signals to all the joint controllers. In the case that one or more joint controllers are connected to the processor 301 independently via individual communication links, then the watchdog state machine disables each communication link. For example, the watchdog state machine may control an in-line switch for each communication link. The watchdog state machine opens the switch on each communication link, thereby preventing the processor 301 from sending driving signals to all the joint controllers. The in-line switch may be implemented by a packet router. The packet router has an input link connected to the processor 301 and several output links, each output link connected to a different joint controller. The packet router receives driving signals in packets from the processor 301, each packet being intended for a specific one of the joint controllers. The packet router analyses each received packet to determine the destination joint controller, and then routes the packet to the destination joint controller on the output link to that destination joint controller. The packet router may comprise a single switch which when opened by the watchdog state machine disables all of the output links to the different joint controllers.

Having disabled the communication link 304 between the processor 301 and the joint controller(s), the watchdog circuitry may send preset joint driving signals to the joint controller(s). The watchdog circuitry may send the preset joint driving signals to the joint controller(s) on the communication link 304. For example, the watchdog circuitry may output the preset joint driving signals on line 411 to the switch 310. The watchdog circuitry controls the operation of the switch 310 to cause the preset driving signals on line 411 to be routed through to the communication link 304. Those preset joint driving signals may cause the joint controller(s) to hold the joints they control in position. If a joint is moving at the time that its associated joint controller receives the preset joint driving signals from the watchdog circuitry, that joint controller may decelerate the joint to a stop and then hold the joint in position. If a joint is stationary at the time that its associated joint controller receives the preset joint driving signals from the watchdog circuity, that joint controller may maintain the joint in that position. The preset joint driving signals may cause the joint controller(s) to reverse the last motion commanded of the joint(s). The present joint driving signals may cause the joint controller(s) to drive the joint(s) to a predetermined safety position.

At step 510, the watchdog circuitry 303 resets the processor 510. To do this, the watchdog circuitry sends a reset control signal on control line 409 to the processor 301. Following the reset, the processor starts to generate the predetermined sequence again according to the sequence protocol, as described above.

At step 511, the watchdog circuitry 303 raises an alarm. To do this, the watchdog circuitry sends a control signal on control line 410 to the alarm 408. This control signal causes the alarm 408 to generate an alarm signal of the type described above.

The steps depicted in the flowchart of FIG. 5 are not necessarily implemented in the order illustrated. For example, steps 502 and 505 may happen concurrently, or step 505 may happen before step 502. The watchdog circuitry is not required to carry out all of the steps of FIG. 5. For example, the watchdog circuitry may be configured to determine whether the received sequence value matches the next expected value in the predetermined sequence, but not whether it was received before a timeout value t'. Conversely, the watchdog circuitry may be configured to determine whether the received sequence value was received before a timeout value t' but not whether it matches the next expected value in the predetermined sequence.

Each joint controller 307, 308, 309 may operate as described with reference to the flowchart of FIG. 6. At step 601, the joint controller determines whether a communication has been received on the communication link 304. In normal operation, this communication is one or more driving signal commands from the processor 301. If the answer to step 601 is YES, then the joint controller moves on to steps 602 and 603. At step 602, the joint controller performs any actions required by the communication. For example, upon receiving driving signal commands from the processor 301, the joint controller drives its associated joint motor(s)

in accordance with the received driving signal. At step 603, the joint controller restarts a timer. Thus, the timer counts the elapsed time since receipt of the last communication from the processor 301. Having restarted the timer, the joint controller moves on to step 604. If the answer to step 601 is NO, then the joint controller moves on to step 604.

At step 604, the joint controller determines whether the elapsed time since receipt of the last communication from the processor 301 exceeds a further timeout value t". The timeout value t" may be stored in a memory external to the joint controller, and reference values sent to the joint controller for comparison. The joint controller may comprise a comparator which compares the current value of the timer to the timeout value t". The timeout value t" may lie in the range 2000 μs<t"<5000 μs. The output of the comparator is one of two values: the first value indicates that the time signal output from the timer is less than the timeout value t"; and the second value indicates that the time signal output from the timer is greater than the timeout value t". If the answer to step 604 is NO, in other words the time signal output by the timer is less than the timeout value t", then the joint controller returns to step 601. If the answer to step 604 is YES, in other words the time signal output by the timer is greater than the timeout value t", then the joint controller moves to step 605.

At step 605 the joint controller enters a fault state. The method then moves to step 606 in which the joint controller holds the joint(s) that it drives in position. If the joint(s) that the joint controller drives are stationary at the time that the joint controller enters the fault state, then the joint controller maintains the joint(s) in that stationary position. If the joint(s) that the joint controller drives are moving at the time that the joint controller enters the fault state, then the joint controller decelerates the joint(s) to a stop, and then holds the joint(s) in that stopped position. The joint controller may implement this deceleration for each joint using current control of the motor driving that joint. The joint controller may then use current control of the motor to maintain the position of the rotor of the motor, and hence the position of the joint. The joint controller may be configured to respond to entering a fault state by performing these action(s) to cause the joint(s) it is controlling to be held in position. Alternatively, the joint controller may cause the joint(s) it is controlling to be held in position, or stopped and then held in position, in response to preset driving signals received on communication link 304 from the watchdog circuitry 303.

Figure 6:
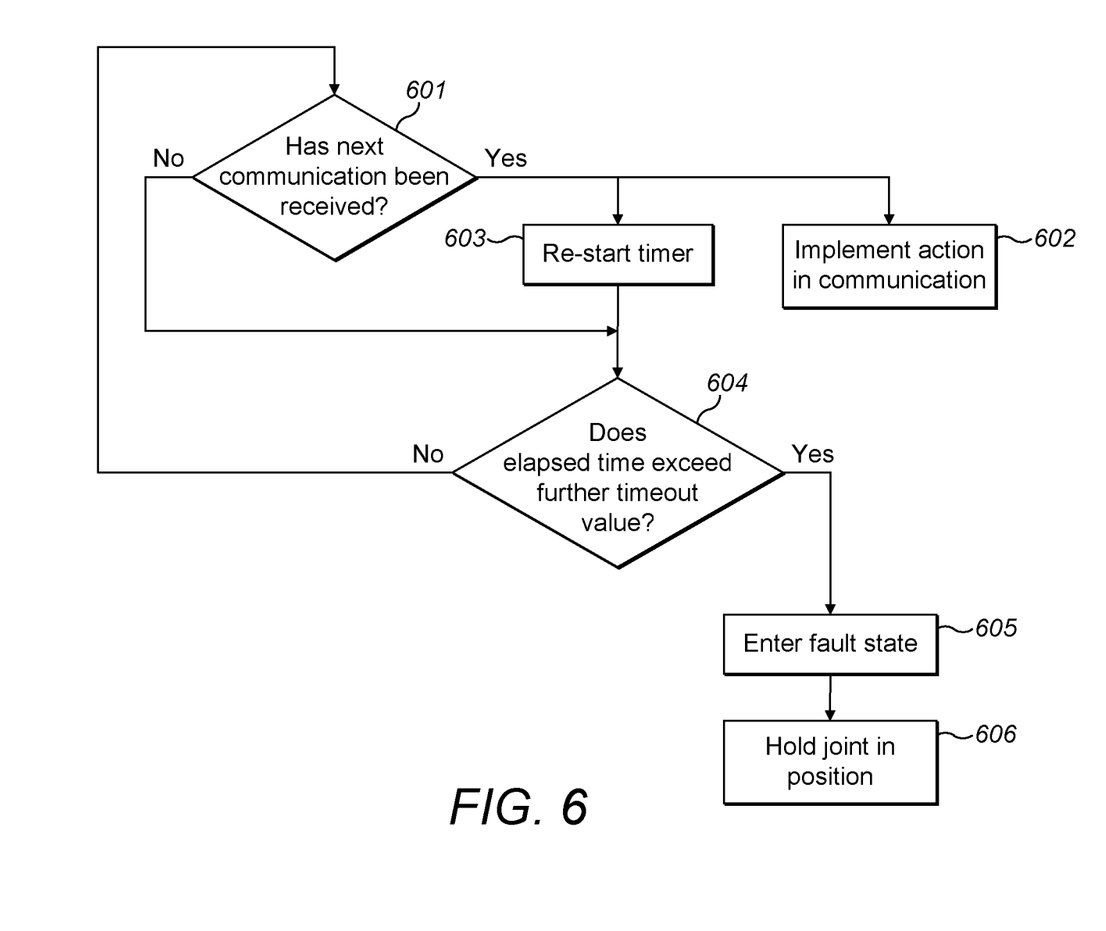
FIG. 6 is a flowchart depicting a method carried out by a joint controller of the surgical robot arm.

The joint controller is not required to carry out all of the steps of FIG. 6. For example, the joint controller may not be configured to enter a fault state upon determining that a communication has not been received on the communication link 304 in a given timeframe. Instead, the outcome of the joint(s) that the joint controller controls being held in position may be achieved solely through the watchdog circuitry commanding the joint controller to hold the joint(s) in position via a communication(s) on communication link 304 once the watchdog circuitry had disabled the communication link between the processor 301 and the joint controller and enabled the communication link between the watchdog circuitry and the joint controller.

The methods and circuitry described herein causes the surgical robot arm to be locked in a fixed position upon determination by the watchdog circuitry in the surgical robot arm controller that the processor of the surgical robot arm controller is faulty. That fault is detected by means of a violation in a predetermined sequence which is sent from the processor to the watchdog circuitry. The processor is configured to continually send the predetermined sequence to the watchdog circuitry. Thus, a violation in transmission of that predetermined sequence is indicative of a fault with the processor. The watchdog circuitry causes the surgical robot arm to be locked in a fixed position by disabling the communication link(s) between the processor and the joint controller(s) of the surgical robot arm that is used to transmit driving signals to the joint controller(s).

Generally speaking, faults in robot arms are signalled using a dedicated fault communication network. This network has the sole function of transmitting fault signals. The methods and circuitry described herein avoids requiring a dedicated fault communication network. Instead, the communication link(s) between the processor and the joint controller(s) which are used to transmit driving signals from the processor to the joint controller(s) are manipulated in the event of a fault to perform one or more of the following functions: (i) prevent the processor 301 from sending driving signals to the joint controller(s); (ii) indicate a fault to the joint controller(s); and (iii) send preset driving signals to the joint controller(s) to hold the joint(s) in position. Thus, the communication link 304 is used for both communicating driving signals and communicating fault signals. No additional communication network is required solely for fault communication.

The robot described herein could be for purposes other than surgery. For example, the port could be an inspection port in a manufactured article such as a car engine and the robot could control a viewing tool for viewing inside the engine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A surgical robot comprising:
a surgical robot arm comprising a set of joints and a joint controller, the joint controller configured to drive a joint of the set of joints; and
a surgical robot arm controller comprising a processor and watchdog circuitry, the processor configured to send joint driving signals to the joint controller on a communication link, the watchdog circuitry configured to:
receive sequence values from the processor;
determine whether each received sequence value matches a next expected value of a predetermined sequence; and
if the received sequence value does not match the next expected value of the predetermined sequence, disable the communication link between the processor and the joint controller.

2. A surgical robot as claimed in claim 1, wherein the watchdog circuitry is configured to:
count time elapsed from receipt of a sequence value;
compare the time to a timeout value; and
if the time exceeds the timeout value before receipt of another sequence value, disable the communication link between the processor and the joint controller.

3. A surgical robot as claimed in claim 1, comprising a switch on the communication link between the processor and the joint controller, a state of the switch being controllable by the watchdog circuitry, wherein the watchdog circuitry is configured to open the switch to disable the communication link between the processor and the joint controller.

4. A surgical robot as claimed in claim 3, wherein the communication link is an ethernet link, and the switch is an ethernet switch.

5. A surgical robot as claimed in claim 1, wherein the joint controller is configured to:
count time elapsed from receipt of a communication from the processor;
compare the time to a further timeout value; and
if the time exceeds the further timeout value before receipt of another communication from the processor, enter a fault state.

6. A surgical robot as claimed in claim 5, wherein if the joint that the joint controller is configured to drive is stationary at the time the joint controller enters the fault state, the joint controller holds the joint in position.

7. A surgical robot as claimed in claim 5, wherein if the joint that the joint controller is configured to drive is moving at the time the joint controller enters the fault state, the joint controller decelerates the joint to a stop and then holds the joint in position.

8. A surgical robot as claimed in claim 1, wherein on disabling the communication link between the processor and the joint controller, the watchdog circuitry is configured to send preset joint driving signals to the joint controller, those present joint driving signals being so as to cause the joint controller to hold the joint in position.

9. A surgical robot as claimed in claim 1, wherein on disabling the communication link between the processor and the joint controller, the watchdog circuitry is configured to reset the processor.

10. A surgical robot as claimed in claim 9, wherein on being reset, the processor is configured to send a predetermined starting sequence value to the watchdog circuitry at a predetermined time after the reset.

11. A surgical robot as claimed in claim 1, wherein on disabling the communication link between the processor and the joint controller, the watchdog circuitry is configured to raise an alarm.

12. A surgical robot as claimed in claim 1, wherein the predetermined sequence is a Gray code.

13. A surgical robot as claimed in claim 1, wherein the watchdog circuitry is configured to generate the predetermine sequence.

14. A surgical robot as claimed in claim 1, wherein the processor is configured to generate the sequence values, and send the sequence values to the watchdog circuitry.

15. A surgical robot as claimed in claim 1, wherein the surgical robot arm controller is either (i) integrated in the surgical robot arm, or (ii) integrated into a support configured to support the surgical robot arm.

16. A surgical robot as claimed in claim 1, wherein the surgical robot arm comprises a set of joint controllers, each joint controller configured to drive a respective joint of the set of joints, the processor being configured to send joint driving signals to each joint controller on the communication link.

17. A surgical robot as claimed in claim 16, wherein the joint controllers are connected together in a linear chain such that disabling the communication link prevents joint driving signals being sent from the processor to each joint controller.

18. A surgical robot as claimed in claim 16, wherein each joint controller is configured to:
count time elapsed from receipt of a communication from the processor;
compare the time to a further timeout value; and
if the time exceeds the further timeout value before receipt of another communication from the processor, enter a fault state.

19. A surgical robot as claimed in claim 1, wherein the surgical robot arm comprises a set of joint controllers, each joint controller configured to drive a respective joint of the set of joints, the processor being configured to send joint driving signals to each joint controller on a respective communication link between the processor and that joint controller.

20. A surgical robot as claimed in claim 19, wherein if the received sequence value does not match a corresponding value of the predetermined sequence, the watchdog circuitry is configured to disable each communication link between the processor and the set of joint controllers.

* * * * *